United States Patent
Kim et al.

(10) Patent No.: US 9,780,367 B2
(45) Date of Patent: Oct. 3, 2017

(54) ANODE ACTIVE MATERIAL FOR LITHIUM SECONDARY BATTERY, METHOD OF PREPARING THE SAME, AND LITHIUM SECONDARY BATTERY INCLUDING THE SAME

(71) Applicant: LG Chem, Ltd., Seoul (KR)

(72) Inventors: Je-Young Kim, Daejeon (KR); Hyun-Chul Kim, Daejeon (KR); Yong-Ju Lee, Daejeon (KR)

(73) Assignee: LG Chem, Ltd. (KR)

(*) Notice: Subject to any disclaimer, the term of this patent is extended or adjusted under 35 U.S.C. 154(b) by 137 days.

(21) Appl. No.: 14/771,041

(22) PCT Filed: May 7, 2014

(86) PCT No.: PCT/KR2014/003995
§ 371 (c)(1),
(2) Date: Aug. 27, 2015

(87) PCT Pub. No.: WO2014/182036
PCT Pub. Date: Nov. 13, 2014

(65) Prior Publication Data
US 2016/0006027 A1    Jan. 7, 2016

(30) Foreign Application Priority Data

May 7, 2013    (KR) .................. 10-2013-0051347

(51) Int. Cl.
*H01M 4/38*    (2006.01)
*H01M 4/04*    (2006.01)
(Continued)

(52) U.S. Cl.
CPC ............ *H01M 4/386* (2013.01); *H01M 4/04* (2013.01); *H01M 4/0428* (2013.01); *H01M 4/13* (2013.01);
(Continued)

(58) Field of Classification Search
CPC .................... H01M 4/366; H01M 4/386
(Continued)

(56) References Cited

U.S. PATENT DOCUMENTS

2012/0077087 A1*  3/2012  Cho ............... H01M 4/133
                                              429/219
2012/0141872 A1    6/2012  Kim et al.
(Continued)

FOREIGN PATENT DOCUMENTS

JP    2009259723 A    11/2009
JP    2012162840 A     8/2012
(Continued)

OTHER PUBLICATIONS

Search Report from European Application No. 14794196.7, dated May 11, 2016.
(Continued)

*Primary Examiner* — Basia Ridley
*Assistant Examiner* — James Erwin
(74) *Attorney, Agent, or Firm* — Lerner, David, Littenberg, Krumholz & Mentlik, LLP

(57) ABSTRACT

Disclosed herein is a non-carbon-based anode active material for lithium secondary batteries, including: a core containing silicon (Si); and silicon nanoparticles formed on the surface of the core. The non-carbon-based anode active material is advantageous in that the increase in the volume expansion during charging-discharging can be prevented by the application of silicon nanoparticles, and in that SiOx (x<1.0) can be easily prepared.

19 Claims, 2 Drawing Sheets

(51) Int. Cl.

| | |
|---|---|
| *H01M 4/1395* | (2010.01) |
| *H01M 4/36* | (2006.01) |
| *H01M 4/583* | (2010.01) |
| *H01M 4/62* | (2006.01) |
| *H01M 4/13* | (2010.01) |
| *H01M 4/48* | (2010.01) |
| *H01M 10/052* | (2010.01) |
| *H01M 4/02* | (2006.01) |

(52) U.S. Cl.
CPC ......... *H01M 4/1395* (2013.01); *H01M 4/366* (2013.01); *H01M 4/483* (2013.01); *H01M 4/583* (2013.01); *H01M 4/625* (2013.01); *H01M 10/052* (2013.01); *H01M 2004/027* (2013.01)

(58) Field of Classification Search
USPC ...................................................... 429/231.8
See application file for complete search history.

(56) References Cited

U.S. PATENT DOCUMENTS

| | | | |
|---|---|---|---|
| 2012/0181477 A1 | 7/2012 | Kanno et al. | |
| 2012/0190261 A1 | 7/2012 | Michihata et al. | |
| 2013/0004846 A1 | 1/2013 | Kim et al. | |
| 2013/0216907 A1* | 8/2013 | Rayner | B22F 9/04 |
| | | | 429/211 |
| 2013/0224583 A1 | 8/2013 | Green | |

FOREIGN PATENT DOCUMENTS

| | | |
|---|---|---|
| KR | 20100138607 A | 12/2010 |
| KR | 20120089512 A | 8/2012 |
| KR | 20130004536 A | 1/2013 |
| KR | 20130016727 A | 2/2013 |
| KR | 20120062920 | 5/2014 |
| TW | 201228082 A | 7/2012 |
| WO | 2012000854 A1 | 1/2012 |
| WO | 2013061079 A1 | 5/2013 |

OTHER PUBLICATIONS

Cui, et al., "Inorganic Glue Enabling High Performance of Silicon Particles as Lithium Ion Battery Anode." Journal of the Electrochemical Society, vol. 158 (5), 2011, pp. A592-A596.

Hu, et al., "Si nanoparticle-decorated nanwire networks for Li-ion Battery anodes." Chemical Communications, vol. 47, 2011, pp. 367-369.

Huang, et al., "Stress generation during lithiation of high-capacity electrode particles in lithium ion batteries." Acta Materialia, Elsevier, Oxford, GB, vol. 61, No. 12, May 3, 2013, pp. 4354-4364.

Hu, Yong-Sheng et al., "Superior Storage Performance of a Si@SiOx/C Nanocomposite as Anode Material for Lithium-Ion Batteries." Angewante Chemie International Edition, vol. 47, No. 9, Feb. 15, 2008, pp. 1645-1649.

International Search Report for Application No. PCT/KR2014/003995 dated Aug. 29, 2014.

* cited by examiner

ANODE ACTIVE MATERIAL FOR LITHIUM SECONDARY BATTERY, METHOD OF PREPARING THE SAME, AND LITHIUM SECONDARY BATTERY INCLUDING THE SAME

CROSS REFERENCE TO RELATED APPLICATIONS

The present application is a national phase entry under 35 U.S.C. §371 of International Application No. PCT/KR2014/003995, filed May 7, 2014, which claims priority from Korean Patent Application No. 10-2013-0051347, filed May 7, 2013; the disclosures of which are incorporated herein by reference.

BACKGROUND OF THE INVENTION

1. Technical Field

The present invention relates to an anode active material for lithium secondary batteries, a preparation method thereof and a lithium secondary battery including the same. More particularly, the present invention relates to an anode active material for lithium secondary batteries, which includes a silicon-containing core provided on the surface thereof with silicon nanoparticles, a preparation method thereof and a lithium secondary battery including the same.

2. Description of the Related Art

Generally, a lithium secondary battery includes: an anode made of a carbon material or a lithium-metal alloy; a cathode made of a lithium-metal oxide; and an electrolyte including an organic solvent and a lithium salt dissolved in the organic solvent. Particularly, as an anode active material constituting an anode of a lithium secondary battery, a lithium metal had initially been used. However, since lithium has a problem of low reversibility and is considered unsafe, currently, a carbon material is being generally used as an anode active material for a lithium secondary battery. Although a carbon material is inferior to a lithium metal in capacity, it has a small volume change and excellent reversibility, and is advantageous in terms of price.

However, with the increase in the usage of lithium secondary batteries, demands for large-capacity lithium secondary battery have gradually increased, and thus a large-capacity anode active material that can replace a carbon material has been required. In order to meet such a requirement, attempts to use a metal (for example, silicon (Si)), having a larger charge-discharge capacity than a carbon material and capable of being electrochemically alloyed together with lithium, as an anode active material have been conducted.

However, such as metal-based anode active material is problematic in that its volume is greatly changed during charging-discharging, and thus an active material layer is cracked. Therefore, a rechargeable battery including this metal-based anode active material is also problematic in that its capacity rapidly decreases during a charge-discharge cycle, and its lifecycle also decreases, and thus it is not commercially available.

However, when a non-carbon material, such as SiO, is used as an anode active material, there are advantages in that high-capacity characteristics can be realized, and volume expansion with respect to Si can be controlled, compared to when a carbon material is used. Thus, research into non-carbon materials has been variously conducted. However, when a non-carbon material is used, there is a disadvantage in that by-products created by the reaction of Li and O cause an irreversible reaction, thus lowering the initial efficiency of a rechargeable battery.

Therefore, in order to overcome the above problems, research into SiOx has been actively conducted. For example, Korean Patent Application Publication No. 2012-7011002 discloses an anode active material for lithium secondary batteries, wherein SiOx is used as an anode active material. However, this anode active material is problematic in that charge-discharge cycle characteristics cannot be sufficiently improved, and in that the x value of SiOx cannot be easily adjusted by a conventional synthesis method.

PRIOR ART DOCUMENT

Patent Document (Patent document 1) Korean Patent Application Publication No. 2012-7011002

SUMMARY OF THE INVENTION

The present invention has been made to solve the above-mentioned problems, and an object of the present invention is to provide a non-carbon-based anode active material for lithium secondary batteries, wherein the decrease in the initial efficiency of a lithium secondary battery, attributable to the initial irreversible reaction caused by oxygen (O) of a SiO material, can be prevented by the preparation of SiOx ($x<1.0$), and wherein volume expansion during charging-discharging, which is a disadvantage of silicon (Si), can be overcome by the application of silicon nanoparticles.

In order to accomplish the above object, an aspect of the present invention provides a non-carbon-based anode active material for lithium secondary batteries, including: a core containing silicon (Si); and silicon nanoparticles formed on the surface of the core.

The non-carbon-based anode active material may further include a coating layer formed on the surface of the core and containing carbon (C).

Another aspect of the present invention provides a method of preparing a non-carbon-based anode active material for lithium secondary batteries, including the steps of: preparing a core containing silicon (Si); and mixing silicon nanoparticles with the core to attaching the silicon nanoparticles to the surface of the core.

Still another aspect of the present invention provides a lithium secondary battery, including: an anode including the anode active material; a cathode including a cathode active material; and an electrolyte.

When the non-carbon-based anode active material for lithium secondary batteries according to the present invention is used, an irreversible effect occurring during the initial charging of a lithium secondary battery is reduced to improve the initial efficiency of the lithium secondary battery, and the increase in the volume expansion rate thereof during charging-discharging can be prevented by the application of silicon nanoparticles. Further, when the core containing silicon (Si) and the silicon nanoparticles are carbon-coated, the adhesivity and conductivity between the core and the silicon nanoparticles are enhanced to improve charge-discharge cycle characteristics.

DESCRIPTION OF THE PREFERRED EMBODIMENTS

Figure 1:
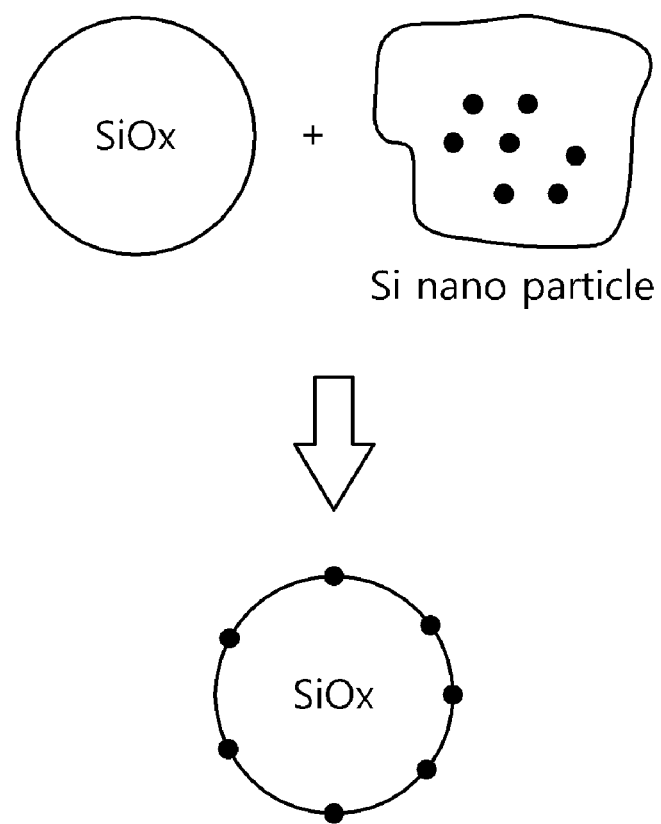
FIG. 1 and FIG. 2 are schematic view showing a process of preparing a non-carbon-based anode active material for lithium secondary batteries.

Hereinafter, preferred embodiment of the present invention will be described in detail.

The non-carbon-based anode active material for lithium secondary batteries according to the present invention includes: a core containing silicon (Si); and silicon nanoparticles formed on the surface of the core.

The core containing silicon (Si) has a particle diameter of 1 to 30 μm, preferably 3 to 20 μm, and more preferably 3 to 10 μm. When the particle diameter of the core is less than 1 μm, the purity of the core is lowered due to the surface oxidation thereof, and the core is bonded with nanosized silicon (Si) to cause agglomeration, and, when the particle diameter thereof is more than 30 μm, volume expansion increases, thus deteriorating cycle characteristics.

The core containing silicon (Si) may include $SiO_x$ ($0<x=1$), preferably, SiO. Further, it is preferred that SiO included in the core be amorphous. When the core is amorphous, the pulverization of the core can be prevented or reduced even when the volume of the core is changed by the insertion and desertion of lithium, and the side reaction of the core with silicon and an electrolyte can also be prevented or reduced.

The silicon nanoparticles formed on the surface of the core have a particle diameter of 5 to 100 nm, preferably 20 to 80 nm, and more preferably 30 to 50 nm. When the particle diameter of the silicon nanoparticles is less than 5 nm, the silicon nanoparticles agglomerate, and are thus be uniformly dispersed in an active material, and, when the particle diameter thereof is more than 100 nm, volume change becomes severe during a charging-discharging cycle, thus deteriorating electrical contact or stripping an active material from a current collector.

The silicon nanoparticles may be included in an amount of 20 to 200 parts by weight, preferably 30 to 150 parts by weight, and more preferably 50 to 100 parts by weight, based on 100 parts by weight of the core. The content of the silicon nanoparticles is present in the range of 20 to 200 parts by weight, the deterioration of cycle characteristics attributable to volume expansion is minimized, and thus the initial efficiency of a lithium secondary battery can be improved.

The non-carbon-based anode active material for lithium secondary batteries according to the present invention may further include a coating layer formed on the surface of the core and containing carbon (C). The coating layer containing carbon (C) can maintain the electrical connection between the cores, and can prevent or reduce the agglomeration or contamination of the cores. The coating layer may be formed on a part of the surface of the core, and, preferably, may be formed on the entire surface of the core. The coating layer may have a thickness of 0.5 to 5 nm. When the thickness of the coating layer is present within the above range, the pulverization of the core can be effectively prevented or reduced although the volume of the core is changed by the insertion and desertion of lithium, and the side reaction of the coating layer with silicon and an electrolyte can be effectively prevented and reduced. The coating layer may be included in an amount of 3 to 70 wt %, based on the total amount of the non-carbon-based anode active material for lithium secondary battery. When the amount of the coating layer is less than 3 wt %, it is difficult to form a uniform conductive film over the entire powder, and, when the amount thereof is more than 70 w %, the ratio of graphite in the anode active material increases to cause a irreversible reaction, thus reducing the initial efficiency and capacity of a lithium secondary battery.

The method of preparing a non-carbon-based anode active material for lithium secondary batteries according to the present invention includes the steps of: preparing a core containing silicon (Si); and mixing silicon nanoparticles with the core to attaching the silicon nanoparticles to the surface of the core.

First, the step of preparing the core containing silicon (Si) is the step of allowing the core to include silicon (Si), and is not particularly limited. Preferably, the core containing silicon (Si) may be configured such that it includes $SiO_x$ ($0<x=1$).

In the step of attaching the silicon nanoparticles to the surface of the core, as shown in FIG. 1, the silicon nanoparticles are mixed with the core to attach the silicon nanoparticles to the surface of the core. Specifically, the silicon nanoparticles may be mixed with the core by a mechanical treatment method such as ball milling or planetary ball mill, or may be mixed with the core by dispersing the silicon nanoparticles using a dispersant and then stirring the dispersed silicon nanoparticles and the core in a solvent or by dispersing the silicon nanoparticles using ultrasonic waves. The dispersant may be included in an amount of 2 to 10 wt % based on the amount of the mixed solution of the silicon nanoparticles and the core. When the amount of the dispersant is less than 2 wt %, the effect of dispersion of the silicon nanoparticles is not sufficient, and, when the amount thereof is more than 10 wt %, side reactions take place, thus increasing resistance or decreasing initial efficiency. As the dispersant, dispersants commonly used in the related field may be used. As the solvent used in mixing the silicon nanoparticles and the core, an organic solvent such as ethanol, or an aqueous solvent may be used. Further, the silicon nanoparticles may be attached to the core using a binder, for example, carboxymethylcellulose (CMC) together with the dispersant during the dispersing, and, in this case, adhesivity between the core and the silicon nanoparticles is improved.

The method of preparing a non-carbon-based anode active material for lithium secondary batteries according to the present invention is not particularly limited. Here, silicon nanoparticles may be prepared using Siemens method commonly known in the related field.

Figure 2:
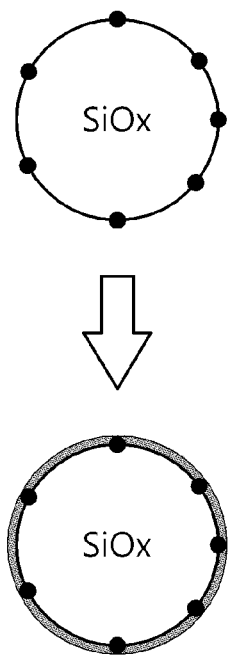

The method of preparing a non-carbon-based anode active material for lithium secondary batteries according to the present invention, as shown in FIG. 2, may further include the step of forming a coating layer containing carbon on the surface of the core attached with the silicon nanoparticles.

The coating layer containing carbon may be formed by chemical vapor deposition, pitch coating or the like, but is not limited thereto.

The lithium secondary battery according to the present invention includes: an anode including the anode active material; a cathode including a cathode active material; and an electrolyte.

In the present invention, as the cathode active material, lithium-containing transition metal oxides may be used. For example, the cathode active material may be composed of any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0 \le y<1$), $Li(Ni_aCo_bMn_c)O_4$ ($0<a<2$, $0<b<2$, $0<c<2$, $a+b+c=2$), $LiMn_{2-z}Ni_zO_4$ ($0<z<2$), $LiMn_{2-z}Co_zO_4$ ($0<z<2$), $LiCoPO_4$, $LiFePO_4$, and mixtures thereof. Besides these oxides, sulfides, selenides, halides, and the like may be used as the cathode active material.

In the electrolyte solution used in the present invention, lithium salt, included as an electrolyte, may be used without limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The lithium secondary battery of the present invention can be used in battery cells used as power sources of small devices such as mobile phones, and can be used in unit cells of middle and large battery modules including a plurality of battery cells Examples of applicable middle and large devices may include: power tools; electric vehicles including hybrid electric vehicles (HEVs), plug-in hybrid electric vehicles (PHEVs); electric two-wheeled vehicles including electric bicycles (E-bikes) and electric scooters (E-scooters); electric golf carts; electric trucks; commercial vehicles; power storage systems; and the like.

Hereinafter, the present invention will be described in more detail based on the following Examples. However, these Examples are set forth to illustrate the present invention, and the scope of the present invention is not limited thereto. The content ratio "%" and "part" are based on mass, unless otherwise specified.

EXAMPLES

Preparation of Anode Active Material

Synthesis Example 1

100 parts by weight of silicon oxide (SiO, D50: 5 μm) was mixed with 25 parts by weight of SiNP (Silicon nano particle, D50<50 nm). Then, 1 part by weight of low-molecular CMC and 5 parts by weight of a dispersant, dissolved in an aqueous solution, were added to the mixture, and then milling was performed. After the milling, the resulting product was dried to remove moisture therefrom, thus preparing a silicon composite anode active material.

Synthesis Example 2

A silicon composite anode active material was prepared in the same manner as in Synthesis Example 1, except that 100 parts by weight of silicon oxide was mixed with 66 parts by weight of SiNP.

Synthesis Example 3

A silicon composite anode active material was prepared in the same manner as in Synthesis Example 1, except that 100 parts by weight of silicon oxide was mixed with 150 parts by weight of SiNP.

Synthesis Example 4

The silicon composite anode active material prepared in Synthesis Example 1 was coated with carbon by chemical vapor deposition (CVD) under a mixed gas atmosphere of ethylene and argon, and black-powdered silicon composite was collected. The amount of carbon deposited on the silicon composite was 10 wt %, based on the total weight of the silicon composite.

Synthesis Example 5

A silicon composite anode active material was prepared in the same manner as in Synthesis Example 1, except that the particle diameter (D50) of SiNP was 150 nm.

Preparation of Half Cell

Example 1

The silicon composite anode active material prepared in Synthesis Example 1 was mixed with SBR (styrene-butadiene rubber) and CMC (carboxymethylcelluose) at a weight ratio of anode active material:SBR:CMC=97.0:1.5:1.5 to prepare an anode active material slurry. The prepared anode active material slurry was applied onto copper foil having a thickness of 50 μm, dried at 150 for 20 min, and then roll-pressed to prepare an anode.

A coin-type half cell (2016 R-type half cell) was fabricated using the anode, a lithium counter electrode, a microporous polyethylene separator and an electrolyte in a helium-charged glove box. The electrolyte was obtained by dissolving 1M $LiPF_6$ in a mixed solvent of ethylene carbonate and dimethyl carbonate (volume ratio: 50:50).

Example 2

A coin-type half cell (2016 R-type half cell) was fabricated in the same manner as in Example 1, except that the anode active material prepared in Synthesis Example 2 was used.

Example 3

A coin-type half cell (2016 R-type half cell) was fabricated in the same manner as in Example 1, except that the anode active material prepared in Synthesis Example 3 was used.

Example 4

A coin-type half cell (2016 R-type half cell) was fabricated in the same manner as in Example 1, except that the anode active material prepared in Synthesis Example 4 was used.

Example 5

A coin-type half cell (2016 R-type half cell) was fabricated in the same manner as in Example 1, except that the anode active material prepared in Synthesis Example 5 was used.

Comparative Example 1

A coin-type half cell (2016 R-type half cell) was fabricated in the same manner as in Example 1, except that SiO powder, commercially available from Sigma Aldrich Corporation, was used as an anode active material for a lithium secondary battery.

Test Example 1: Measurement of Initial Charging Capacity, Initial Discharging Capacity, Coulombic Efficiency and Volume Expansion Each of the half cells fabricated in Examples 1 to 5 and Comparative Example 1 was charged and discharged once under a voltage of 0 V to 1.5 V and a charge amount of 0.2 C (900 mA/g), and the initial charging capacity, initial discharging capacity, coulombic efficiency and volume expansion rate thereof were measured. The results thereof are given in Table 1 below.

TABLE 1

|  | Initial charging capacity (mAh/g) | Initial discharging capacity (mAh/g) | Coulombic efficiency (%) | Volume expansion rate (%) |
|---|---|---|---|---|
| Ex. 1 | 2865 mAh/g | 1920 mAh/g | 67% | 61% |
| Ex. 2 | 3200 mAh/g | 2240 mAh/g | 70% | 74% |
| Ex. 3 | 3459 mAh/g | 2560 mAh/g | 74% | 84% |
| Ex. 4 | 3150 mAh/g | 2583 mAh/g | 82% | 74% |
| Ex. 5 | 3245 mAh/g | 2272 mAh/g | 70% | 127% |
| Comp. Ex. 1 | 2548 mAh/g | 1580 mAh/g | 62% | 53% |

In the case of each of the half cells of Examples 1 to 5, using the anode active material for lithium secondary batteries according to the present invention, the surface of SiO constituting a core is provided with silicon nanoparticles, so the ratio of Si in $SiO_x$ of the anode active material becomes high, the initial charging capacity, initial discharging capacity and coulombic efficiency thereof was excellent.

Particularly, in the case of the carbon-coated half cell of Example 4, the conductivity in an electrode to a silicon material is provided, and thus coulombic efficiency increases, thereby increasing discharging capacity.

In the case of the half cell of Example 5, this half cell have the same charging capacity, discharging capacity and coulombic efficiency as those of the half cell of Example 2, but its volume expansion increases with the increase in particle size of SiNP.

What is claimed is:

1. A non-carbon-based anode active material for lithium secondary batteries, comprising:
   a core containing silicon (Si); and
   silicon nanoparticles formed on the surface of the core.

2. The non-carbon-based anode active material of claim 1, wherein the silicon nanoparticles are included in an amount of 20 to 200 parts by weight, based on 100 parts by weight of the core.

3. The non-carbon-based anode active material of claim 1, wherein the silicon nanoparticles are included in an amount of 50 to 100 parts by weight, based on 100 parts by weight of the core.

4. The non-carbon-based anode active material of claim 1, wherein the silicon nanoparticles have a particle diameter of 5 to 100 nm.

5. The non-carbon-based anode active material of claim 4, wherein the silicon nanoparticles have a particle diameter of 20 to 80 nm.

6. The non-carbon-based anode active material of claim 1, wherein the core has a particle diameter of 1 to 30 μm.

7. The non-carbon-based anode active material of claim 6, wherein the core has a particle diameter of 3 to 10 μm.

8. The non-carbon-based anode active material of claim 1, further comprising a coating layer formed on the surface of the core and containing carbon (C).

9. The non-carbon-based anode active material of claim 8, wherein the coating layer is included in an amount of 5 to 70 wt %, based on a total amount of the anode active material.

10. The non-carbon-based anode active material of claim 1, wherein the core is made of $SiO_x$ ($0<x\leq1$).

11. The non-carbon-based anode active material of claim 10, wherein the core is made of SiO.

12. The non-carbon-based anode active material of claim 10, wherein the $SiO_x$ ($0<x\leq1$) is amorphous.

13. A method of preparing a non-carbon-based anode active material for lithium secondary batteries, comprising the steps of:
   preparing a core containing silicon (Si); and
   mixing silicon nanoparticles with the core to attach the silicon nanoparticles to the surface of the core.

14. The method of claim 13, wherein the silicon nanoparticles and the core are mixed by ball milling or planetary ball mill.

15. The method of claim 13, wherein the silicon nanoparticles and the core are mixed by dispersing the silicon nanoparticles using a dispersant and then stirring the dispersed silicon nanoparticles and the core in a solvent.

16. The method of claim 13, further comprising the step of forming a coating layer containing carbon on the surface of the core attached with the silicon nanoparticles.

17. The method of claim 15, wherein the dispersant is included in an amount of 2 to 10 wt % based on the amount of the mixed solution of the silicon nanoparticles and the core.

18. The method of claim 16, wherein the coating layer is formed by chemical vapor deposition (CVD) or pitch coating.

19. A lithium secondary battery, comprising:
   an anode including the anode active material of claim 1;
   a cathode including a cathode active material; and
   an electrolyte.

* * * * *